United States Patent [19]

Suda

[11] Patent Number: 4,871,240

[45] Date of Patent: Oct. 3, 1989

[54] ZOOM LENS SYSTEM HAVING A LENS UNIT WITH A VARIABLE REFRACTIVE POWER

[75] Inventor: Shigeyuki Suda, Yokohama, Japan

[73] Assignee: Canon Kabushiki Kaisha, Tokyo, Japan

[21] Appl. No.: 134,154

[22] Filed: Dec. 17, 1987

[30] Foreign Application Priority Data

Dec. 22, 1986 [JP] Japan ................................ 61-303935
Dec. 22, 1986 [JP] Japan ................................ 61-303936

[51] Int. Cl.$^4$ .......................... G02B 15/16; G02B 3/14
[52] U.S. Cl. .................................... 350/427; 350/419; 350/423
[58] Field of Search ................ 350/423, 427, 419, 418

[56] References Cited

U.S. PATENT DOCUMENTS 4,407,567 10/1983 Michalot et al. ..................... 350/423
4,712,882 12/1987 Baba et al. ........................ 350/419 X

FOREIGN PATENT DOCUMENTS 60-254013 12/1985 Japan ................................... 350/419
60-254014 12/1985 Japan ................................... 350/419

Primary Examiner—Scott J. Sugarman
Attorney, Agent, or Firm—Fitzpatrick, Cella, Harper & Scinto

[57] ABSTRACT

Disclosed is a zoom lens comprising a first lens group having a first lens unit movable on the optic axis to effect a magnification change, a correcting lens unit whose refractive power is variable to correct the movement of the image surface during the magnification change, and a second lens group having a second lens unit whose refractive power is variable for the magnification change.

12 Claims, 16 Drawing Sheets (a) f = 11.3

(b) f = 67.1

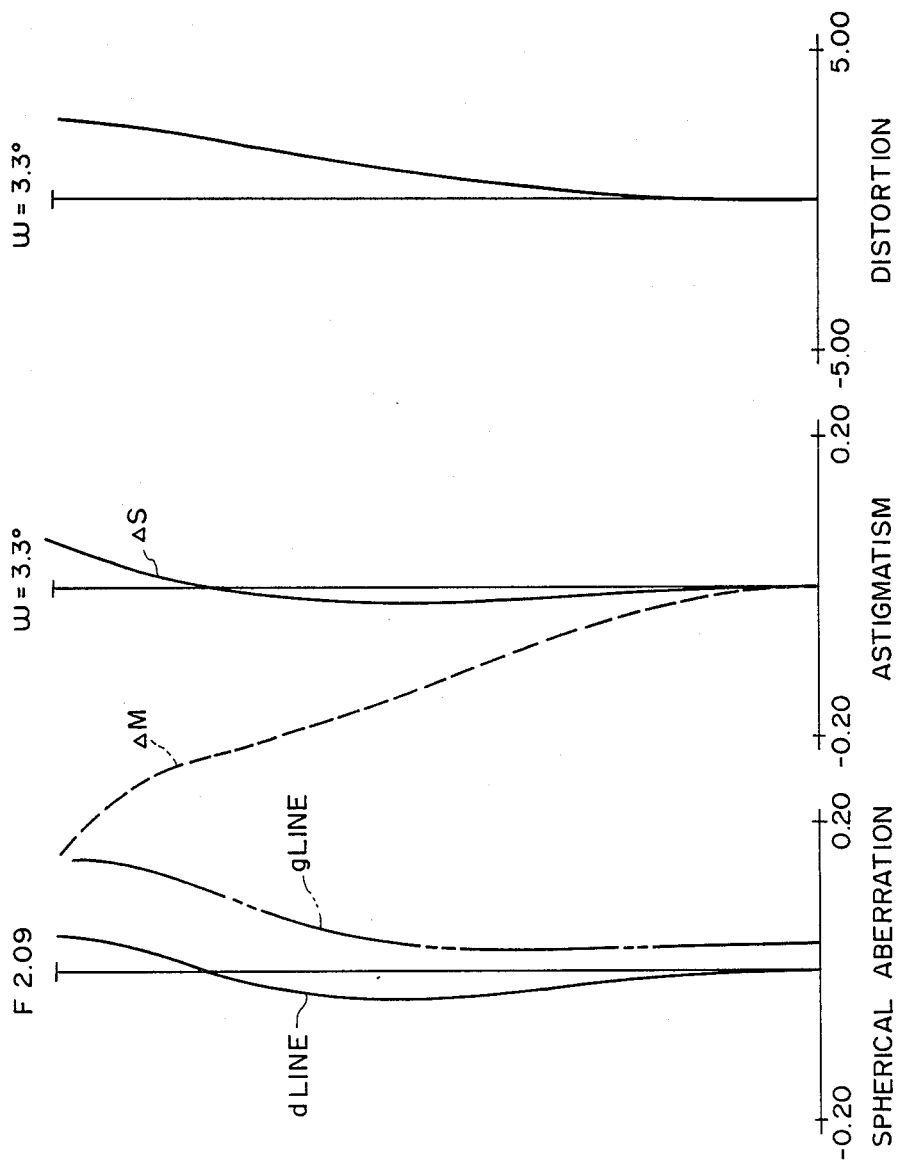

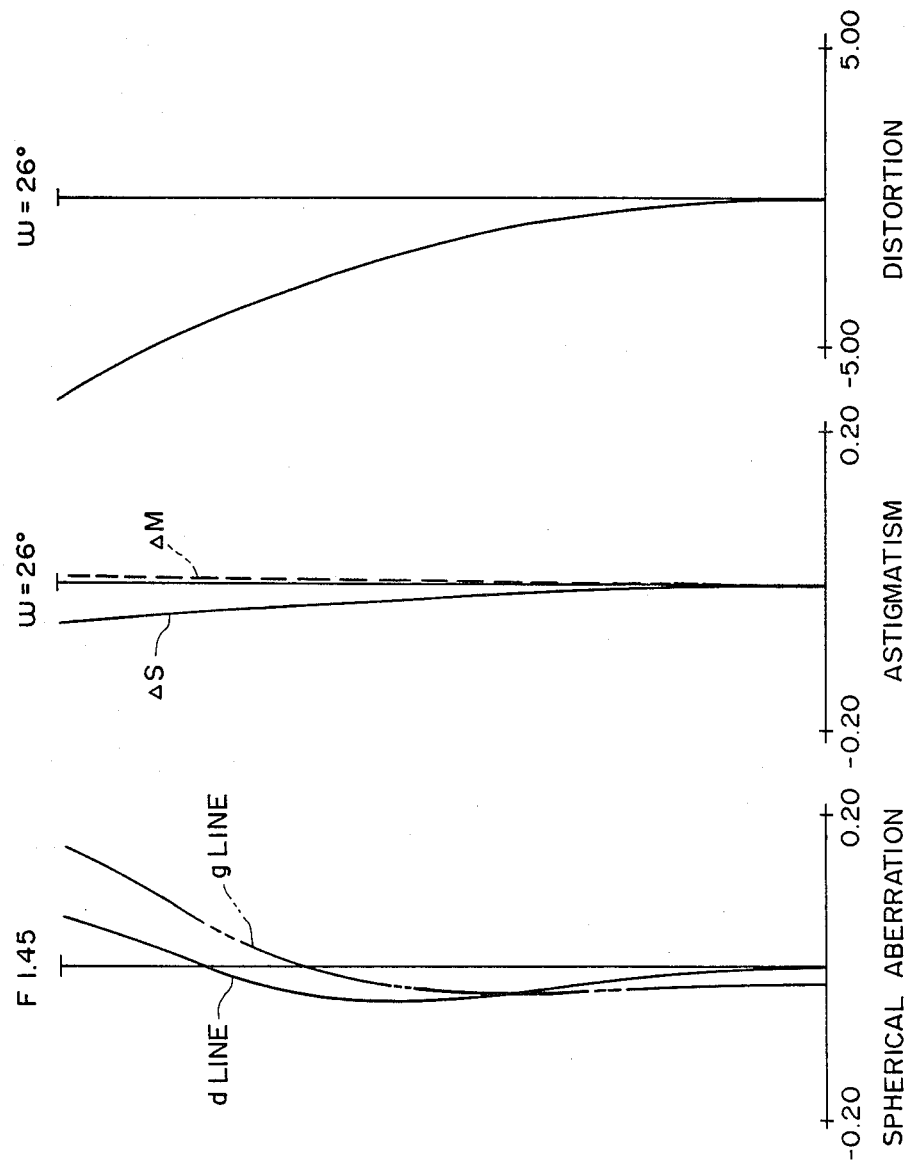

(b) f = 67

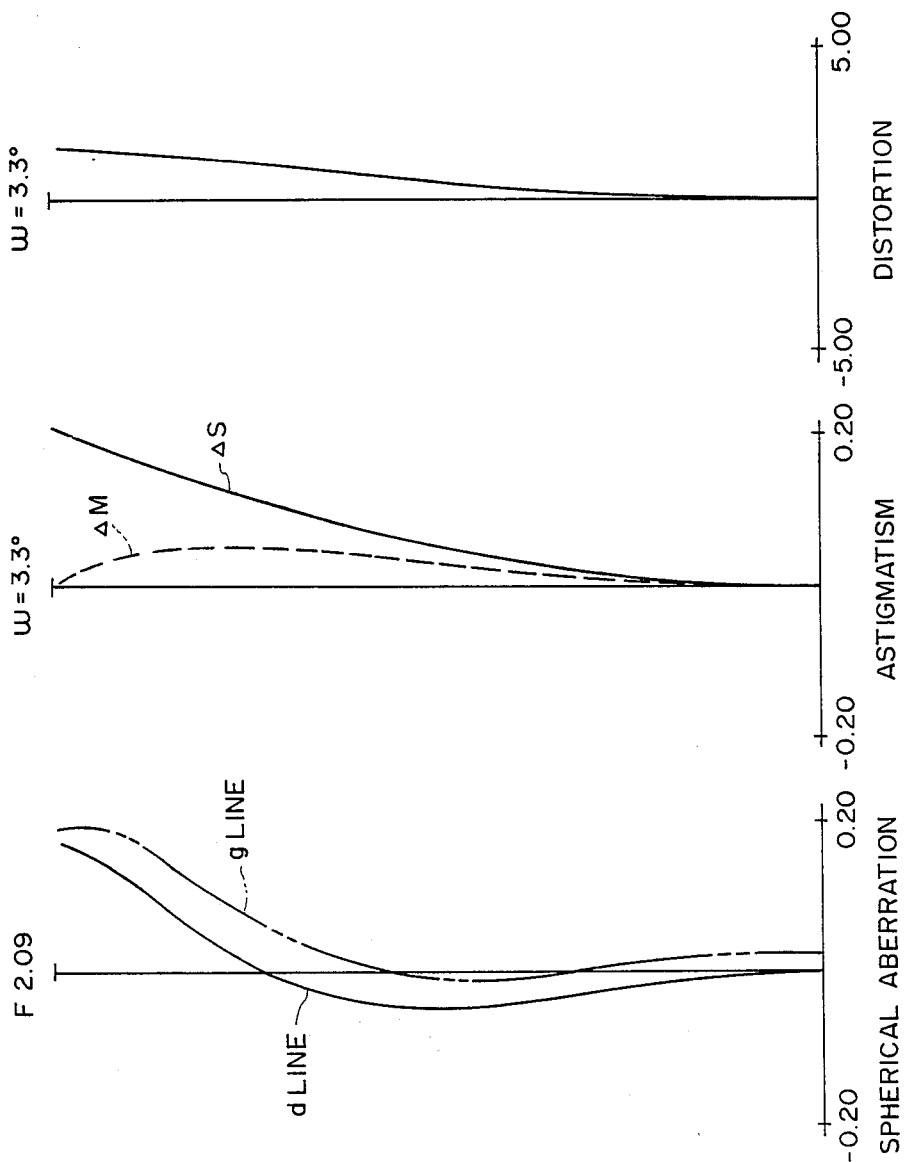

(a) f = 11.3

(b) f = 67

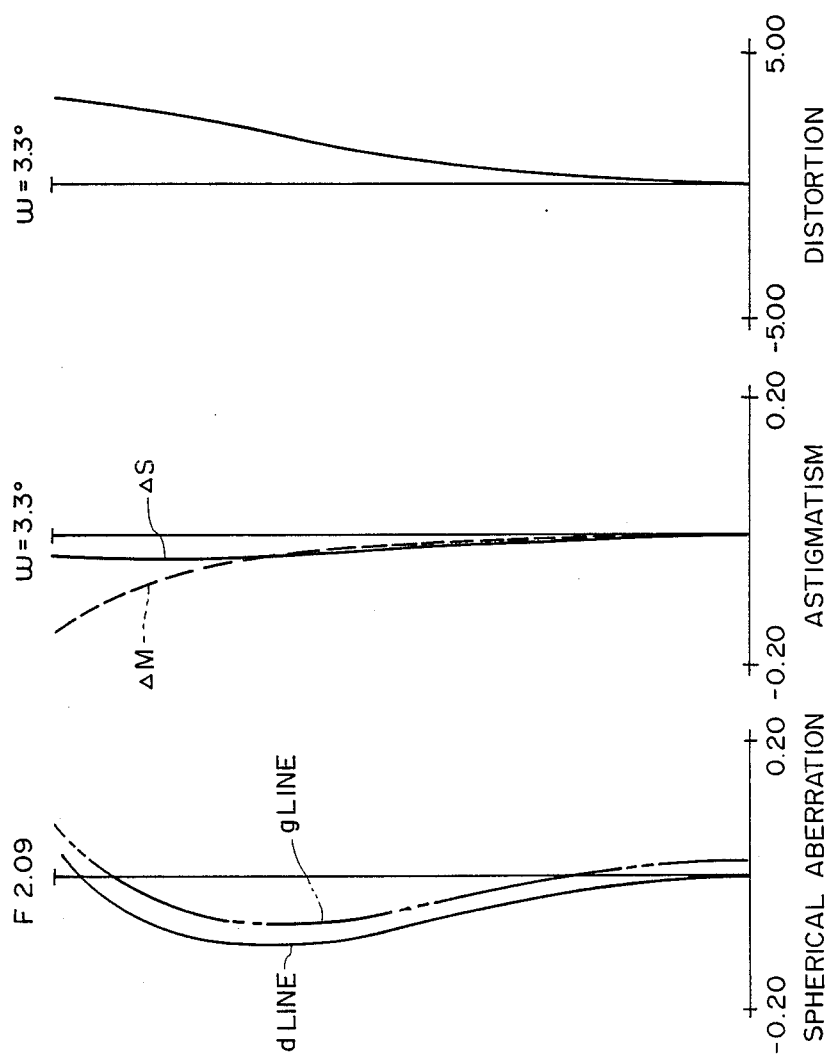

(a) f = 11.3

(b) f = 67

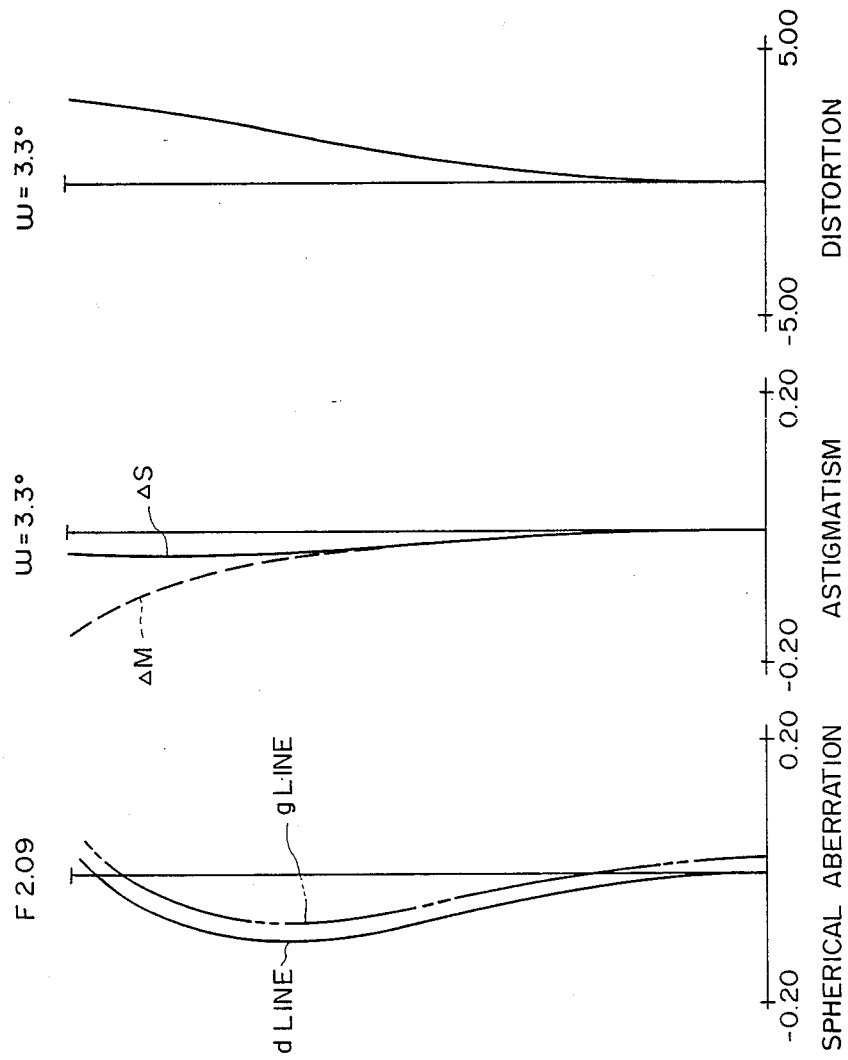

4,871,240

ZOOM LENS SYSTEM HAVING A LENS UNIT WITH A VARIABLE REFRACTIVE POWER

BACKGROUND OF THE INVENTION

1. Field of the Invention

This invention relates to a zoom lens system, and in particular to a zoom lens system for use in a television camera, a video camera, a still camara or the like which utilizes an element whose radius of curvature is variable and which is compact and can obtain a high magnification change ratio.

2. Related Background Art

In zoom lenses, the requirements for compactness and high magnification change ratio have been great, and to satisfy these requirements, there are known the self-contained extender systems as shown in Japanese Pat. Publications Nos. 7606/1986 and 40965/1986. However, these are of the change-over magnification change type and therefore, high mechanical accuracy is required for the securement of the lens containing space and the adjustment of the optic axis, and further, since they are incapable of continuous magnification change, they have suffered from the disadvantage that they cannot be used in the other cases than the changeover of the scene to be photographed or the F-value becomes as great as that at the telephoto end from the intermediate focal length position.

As another means, there is known a zoom lens system in which two zoom portions movable on the optic axis are provided in a photo-taking lens, as seen in Japanese Pat. Publication No. 4461/1977 (U.S. Pat. No. 4,033,674). However, this system has suffered from the disadvantage that particularly the second zoom portion provided on the image surface side, as compared with the ordinary relay portion, results in the complication of the lens construction for the reasons such as the securement of the space for movement and the correction of aberrations and the full length becomes greater.

As the related art, there are the systems disclosed in U.S. Applications Ser. No. 737,342 now U.S. Pat. No. 4,784,479, No. 556,705, No. 813,227 now U.S. Pat. No. 4,820,028, and U.S. Pat. No. 4,407,567, No. 4,678,899.

SUMMARY OF THE INVENTION

It is the object of the present invention to solve the above-noted problems and to provide a zoom lens system which is compact and moreover capable of high magnification change.

DESCRIPTION OF THE PREFERRED EMBODIMENTS

A zoom lens system according to the present invention will hereinafter be described in detail with reference to the drawings.

Figure 1:
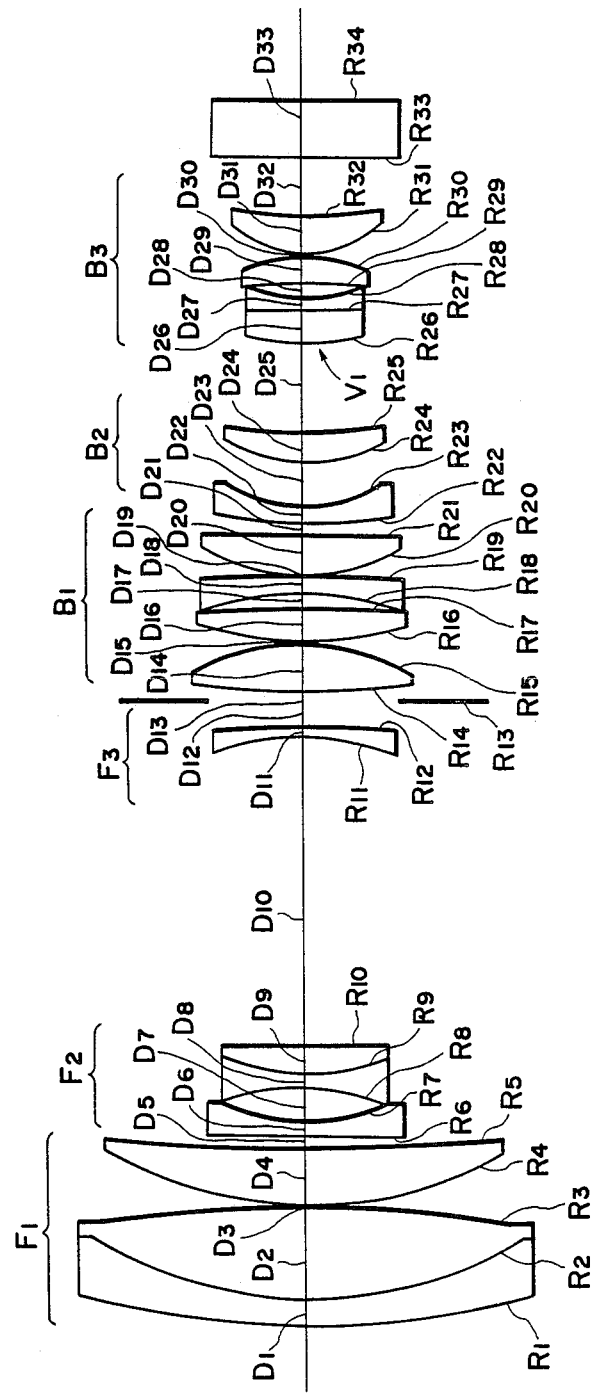
FIG. 1 is a cross-sectional view of a zoom lens system according to an embodiment of the present invention.

FIG. 1 is a cross-sectional view of a zoom lens system according to an embodiment of the present invention.

In FIG. 1, F1 designates a first positive lens unit which governs focusing, and F2 and F3 denote the first magnification changing unit and the first correcting unit, respectively, of a first zoom portion movable on the optic axis. B1 rearward of an iris diaphragm R13 designates a positive lens unit which is a part of a relay and has a positive refractive power, and B2 and B3 denote the second correcting lens unit and the second magnification changing lens unit, respectively, of a second zoom portion.

The lens construction of F1–F3 corresponds to the most popular focus portion and zoom portion disclosed, for example, in Japanese Laid-Open Pat. Application No. 51813/1985. In the present embodiment, the movement of the first magnification changing unit F2 and the first correcting unit F3 in the direction of the optic axis provides about six-fold zoom ratio, and governs the zooming from the wide angle end to the intermediate focal length range (the first magnification range).

The lens units B1, B2 and B3 rearward of the iris diaphragm are made into a construction approximate to the telephoto type by endowing the lens unit B1 close to the object with a positive refractive power as a whole to shorten the full length and the aperture. The lens units B2 and B3 rearward of the lens unit B1 are the second correcting lens unit and the second magnification changing lens unit, respectively, of the second zoom portion, have a magnification change ratio of 1.44 and govern the zooming from the intermediate focal length to the telephoto end (the second magnification change range). The second correcting lens unit B2 is comprised of two negative and positive lenses in succession from the object side, and has a negative refractive power as a whole. The movement of the image surface resulting from the magnification change of the second magnification changing unit B3 is corrected by the movement of the second correcting lens unit B2 in the direction of the optic axis, and the shape of a meniscus concave convex toward the object side and the shape of a convex lens having a sharper curvature on the object side which are effective to suppress the variations in aberrations caused at that time, particularly, the fluctuations of spherical aberration and coma, are selected. Also, the second magnification changing lens unit B3 has its plano-convex or plano-concave surface on the wide angle side comprised of an element V1 of variable radius of curvature, and is made into a system joined to a plano-concave lens of optical glass rearward thereof. Further rearwardly thereof, two positive lenses are added so that the second magnification changing lens unit B3 as a whole provides a positive lens unit even when the radius of curvature of the element V1 is varied.

By the above-described second magnification changing system B1–B3, the second magnification changing lens unit B3 effects a magnification change with the aid of a variation in the radius of curvature without involving the movement of the lens in the direction of the optic axis, whereby as compared with the construction as disclosed in the aforementioned U.S. Pat. No. 4,033,674 wherein a magnification change is accomplished by an ordinary movable lens, a wide lens spacing is not required in the second magnification changing system B1–B3 and therefore, a greater length and complication of the lens system can be avoided.

However, to obtain a magnification change ratio of the order of 1.44 of the second zoom portion B2, B3, the element V1 of variable radius of curvature must be varied in a direction to increase the focal length of the second magnification changing lens unit B3 to about twice, from the intermidiate focal length to the telephoto end, including the amount which offsets the reverse magnification changing effect created by movement of the second correcting lens unit. At this time, the amount of variation in the power of the element V1 need be about 20–30 diopters, and the fluctuation of spherical aberration occurring in this surface must be suppressed to the utmost. As a measure effective for this, it is desirable to approximate, at a point within the range of variation in the radius of curvature of the element V1, to the condition concentric with the on-axis object point in the state of the wide angle side in which the F-number is small, i.e., the condition under which the position of the object point relative to the element V1 and the position of the center of curvature of the element V1 are made coincident with each other.

The above-described construction of the second magnification changing lens unit B3 further causes a variation in the spacing between the principal points of B2 and B3 when the radius of curvature of the element V1, and this has the effect of promoting the magnification change ratio of the second zoom portion and therefore, said construction is more advantageous for correcting aberrations and making the lens system compact.

As the material of the plane shape variable element V1 according to the present invention, silicone suffer is suitable because of its transparency, homogeneity, dynamical characteristic, etc. and therefore, this element has been designed by the use of the refractive index for d-line nd=1.406–1.509 and νd=52.5–34.7. The method of shaping said element and the method of driving said element can be realized by Japanese Laid-Open Pat. Application Nos. 84502/1985, 111201/1985, 114802/1985, 114804/1985, 114805/1985 and 220301/1985. The use of said element usually results in a variation in the center thckness, and that tendency results in an increase in the center thickness when a variation in positive power, i.e., a convex power as the plane shape is added, and a variation in negative power qualitatively results in a converse phenomenon. Accordingly, in the present embodiment, with this taken into account, design is made with the center thickness of the plane shape variable element varied more or less.

Also, in the present embodiment, only the curvature of one surface is varied, but alternatively, the curvatures of both surfaces may be varied.

Figure 2:
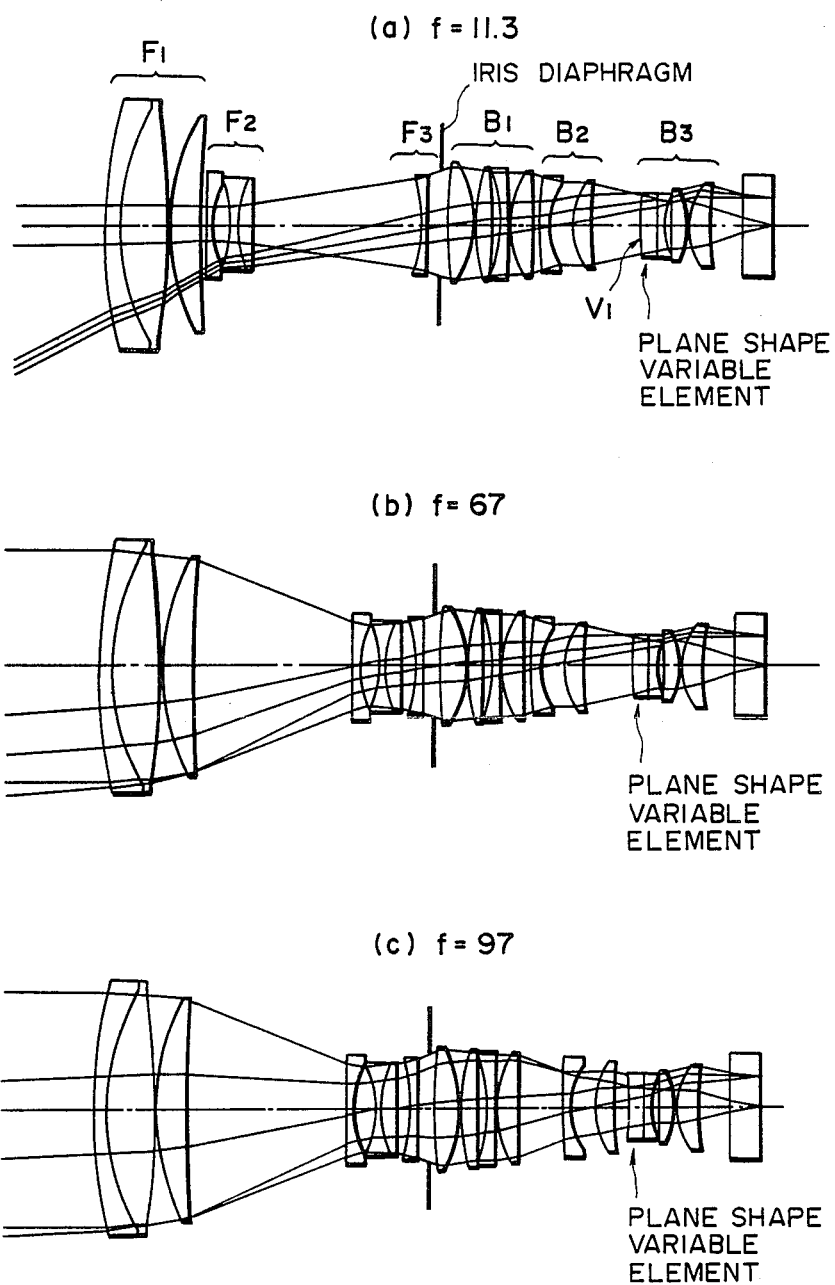
FIGS. 2(a), (b) and (c) show the optical paths of a first embodiment of the zoom lens system according to the present invention.
Figure 3A:
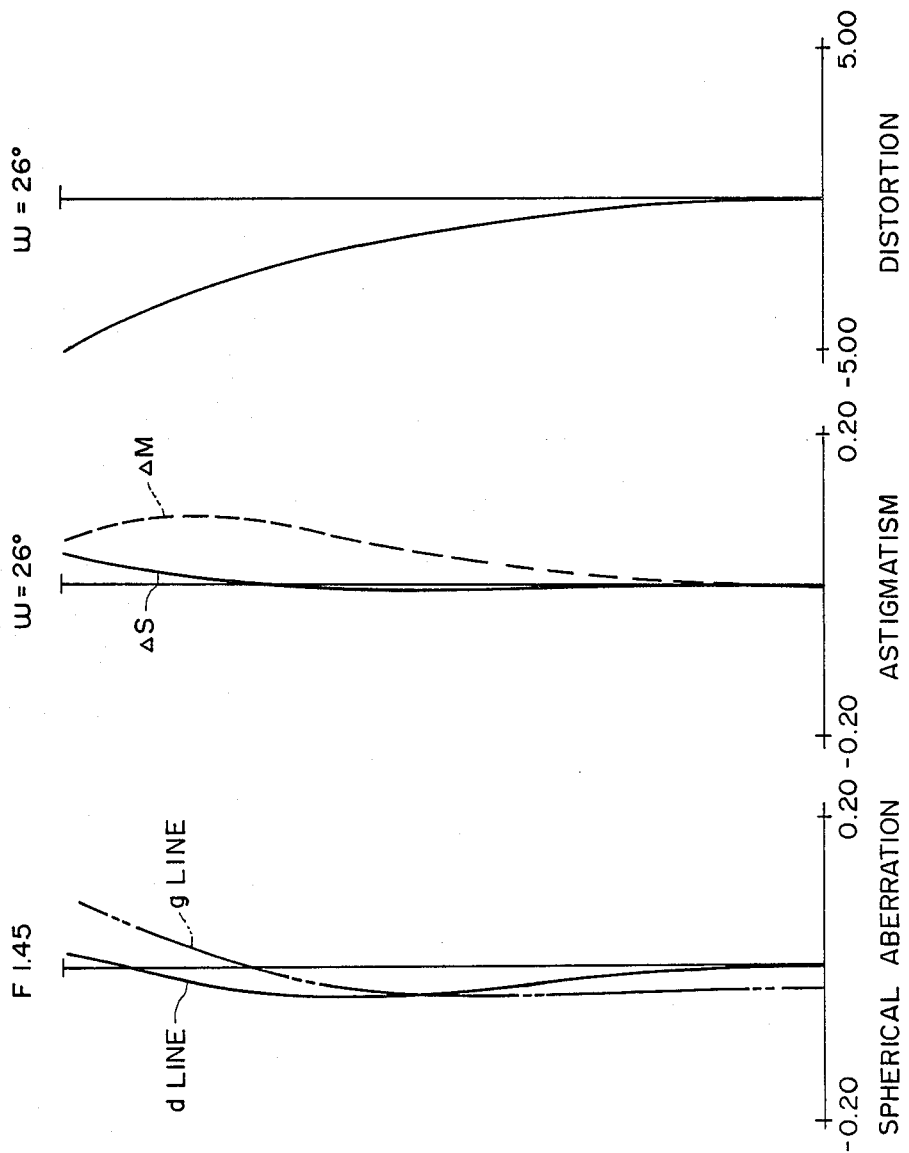
FIGS. 3(a), (b) and (c) show the longitudinal aberrations of numerical value embodiment 1.
Figure 3B:
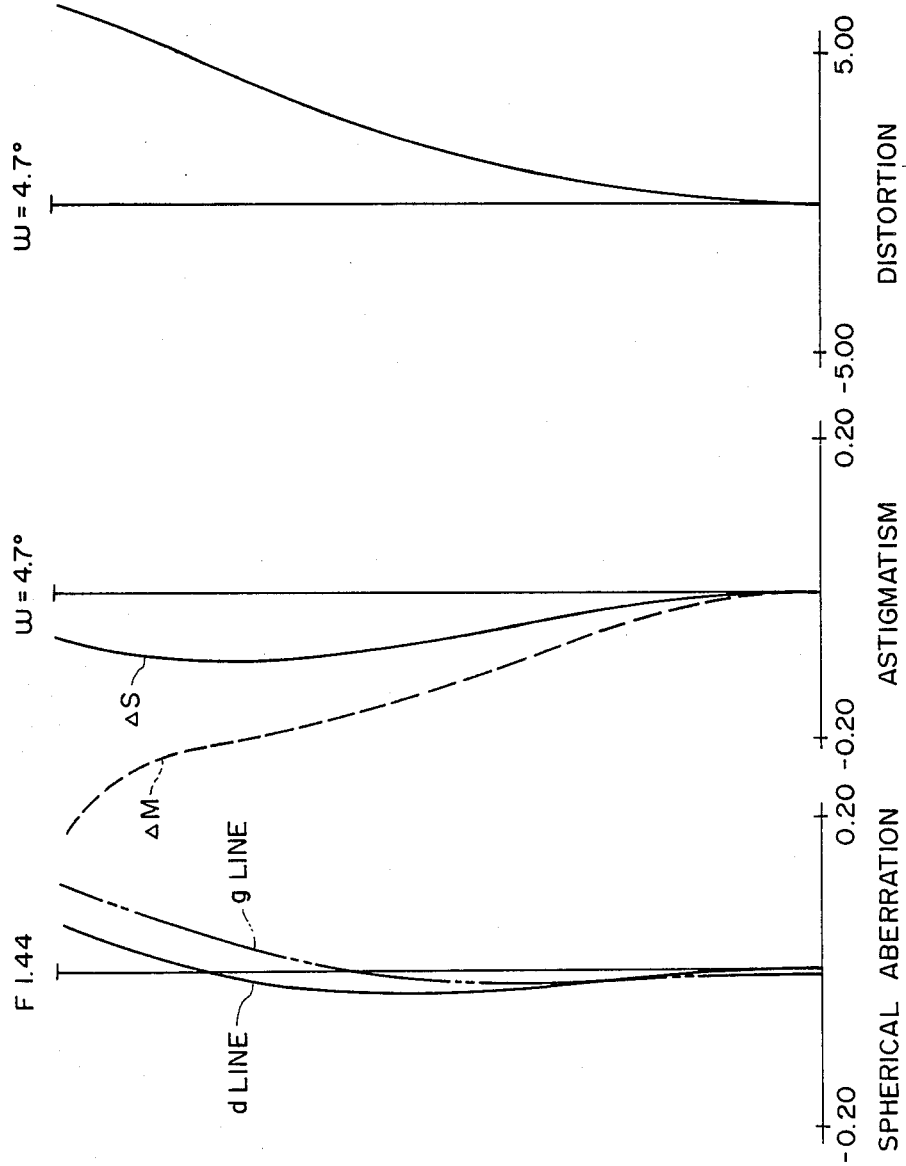
Figure 4B:
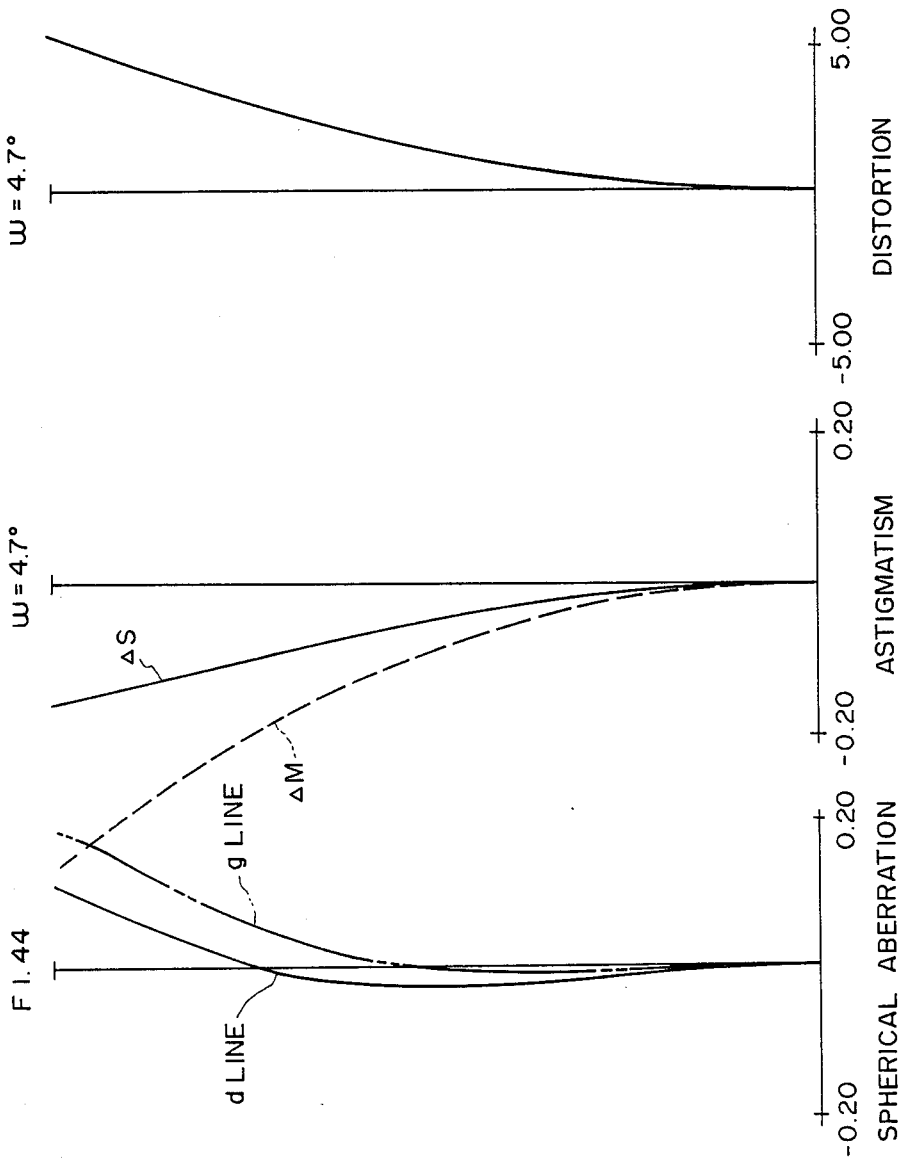
FIGS. 4(a), (b) and (c) show the longitudinal aberrations of numerical value embodiment 2.

FIGS. 2(a), (b) and (c) show the optical paths of a first embodiment of the zoom lens system according o the present invention.

FIG. 2(a) shows the optical path when the focal length f=11.3, FIG. 2(b) shows the optical path when f=67, and FIG. 2(c) shows the optical path when j=97.

Numerical value embodiments of the present invention will be shown below. In the numerical value embodiments, Ri represents the radius of curvature of the ith lens surface from the object side, Di represents the thickness and air space of the ith lens from the object side, and Ni and νi represent the refractive index and the abbe number, respectively, of the glass material of the ith lens from the object side.

In numerical value embodiments 1 and 2, R30 and R31 designate the face plate and filter, respectively, of an image pickup tube used in a video camera or the like.

| (Embodiment 1) | | | |
|---|---|---|---|
| F = 11.3~96.7 FNO = 1:1.45~2.09 2 W = 52°~6.5° (W: field angle) | | | |
| R1 = 101.819 | D1 = 2.65 | N1 = 1.80518 | V1 = 25.4 |
| R2 = 47.457 | D2 = 9.95 | N2 = 1.51633 | V2 = 64.1 |
| R3 = −164.529 | D3 = 0.15 | | |
| R4 = 45.047 | D4 = 6.10 | N3 = 1.60311 | V3 = 60.7 |
| R5 = 282.535 | D5 = 11 | | |
| R6 = 208.567 | D6 = 1.20 | N4 = 1.77250 | V4 = 49.6 |
| R7 = 18.282 | D7 = 4.37 | | |
| R8 = −22.696 | D8 = 1.10 | N5 = 1.69680 | V5 = 55.5 |
| R9 = 22.696 | D9 = 3.20 | N6 = 1.84666 | V6 = 23.9 |
| R10 = −421.934 | D10 = 12 | | |
| R11 = −28.413 | D11 = 1.10 | N7 = 1.69680 | V7 = 55.5 |
| R12 = −219.338 | D12 = 13 | | |
| R13 = iris diaphragm | D13 = 1.00 | | |
| R14 = 97.617 | D14 = 5.21 | N8 = 1.69680 | V8 = 55.5 |
| R15 = −23.644 | D15 = 0.10 | | |
| R16 = 37.257 | D16 = 3.73 | N9 = 1.69680 | V9 = 55.5 |
| R17 = −119.003 | D17 = 1.84 | | |
| R18 = −28.145 | D18 = 1.40 | N10 = 1.84666 | V10 = 23.9 |
| R19 = −298.867 | D19 = 0.10 | | |
| R20 = 20.895 | D20 = 4.14 | N11 = 1.65160 | V11 = 58.6 |
| R21 = 261.403 | D21 = 14 | | |
| R22 = 88.602 | D22 = 1.45 | N12 = 1.69680 | V12 = 55.5 |
| R23 = 13.699 | D23 = 5.09 | | |
| R24 = 15.521 | D24 = 3.31 | N13 = 1.60342 | V13 = 38.0 |
| R25 = 44.366 | D25 = 15 | | |
| R26 = R | D26 = d | N14 = 1.50900 | V14 = 34.7 |
| R27 = ∞ | D27 = 1.00 | N15 = 1.84666 | V15 = 23.9 |
| R28 = 13.607 | D28 = 2.00 | | |
| R29 = −76.383 | D29 = 3.14 | N16 = 1.53172 | V16 = 48.9 |
| R30 = −14.034 | D30 = 0.10 | | |
| R31 = 12.095 | D31 = 4.07 | N17 = 1.64328 | V17 = 47.9 |
| R32 = 45.378 | D32 = 4.62 | | |
| R33 = ∞ | D33 = 6.00 | N18 = 1.511633 | V18 = 64.1 |
| R34 = ∞ | | | |

| f | 11.3 | 67.1 | 96.7 |
|---|---|---|---|
| l1 | 1.0558 | 32.4493 | 32.4493 |
| l2 | 33.8465 | 2.9282 | 2.9282 |
| l3 | 2.4751 | 1.9999 | 1.9999 |
| l4 | 1.4989 | 1.4989 | 8.6649 |
| l5 | 10.0597 | 0.0597 | 3.4937 |
| dV | 3.6 | 3.6 | 3.0 |
| RV | 40.14486 | 40.14486 | −36.68736 |

| (Embodiment 2) | | | |
|---|---|---|---|
| F = 11.3~96.7 FNO = 1:1.45~2.09 2 W = 52°~6.5° (W: field angle) | | | |
| R1 = 101.819 | D1 = 2.65 | N1 = 1.80518 | V1 = 25.4 |
| R2 = 47.457 | D2 = 9.95 | N2 = 1.51633 | V2 = 64.1 |
| R3 = −165.529 | D3 = 0.15 | | |
| R4 = 45.047 | D4 = 6.10 | N3 = 1.60311 | V3 = 60.7 |
| R5 = 282.535 | D5 = 11 | | |
| R6 = 208.567 | D6 = 1.20 | N4 = 1.77250 | V4 = 49.6 |
| R7 = 18.282 | D5 = 4.37 | | |
| R8 = −22.696 | D8 = 1.10 | N5 = 1.69680 | V5 = 55.5 |
| R9 = 22.696 | D9 = 3.20 | N6 = 1.84666 | V6 = 23.9 |
| R10 = −421.934 | D10 = 12 | | |
| R11 = −26.413 | D11 = 1.10 | N7 = 1.69680 | V7 = 55.5 |
| R12 = −219.338 | D12 = 13 | | |
| R13 = iris diaphragm | D13 = 1.30 | | |
| R14 = 97.936 | D14 = 5.20 | N8 = 1.69680 | V8 = 55.5 |

-continued (Embodiment 2)

| | | | |
|---|---|---|---|
| R15 = −25.605 | D15 = 0.10 | | |
| R16 = 33.769 | D16 = 4.00 | N9 = 1.69680 | V9 = 55.5 |
| R17 = −154.198 | D17 = 2.13 | | |
| R18 = −28.657 | D18 = 1.40 | N10 = 1.80518 | V10 = 25.4 |
| R19 = 214.951 | D19 = 0.10 | | |
| R20 = 22.532 | D20 = 5.17 | N11 = 1.63854 | V11 = 55.4 |
| R21 = −125.382 | D21 = 14 | | |
| R22 = 95.214 | D22 = 1.20 | N12 = 1.77250 | V12 = 49.6 |
| R23 = 16.772 | D23 = 1.21 | | |
| R24 = 26.094 | D24 = 3.15 | N13 = 1.72342 | V13 = 38.0 |
| R25 = ∞ | D25 = 15 | | |
| R26 = R | D26 = d | N14 = 1.50900 | V14 = 34.7 |
| R27 = ∞ | D27 = 2.00 | N15 = 1.80518 | V15 = 25.4 |
| R28 = 16.826 | D28 = 1.57 | | |
| R29 = 48.233 | D29 = 3.40 | N16 = 1.77250 | V16 = 49.6 |
| R30 = −46.395 | D30 = 0.10 | | |
| R31 = 14.787 | D31 = 5.00 | N17 = 1.77250 | V17 = 49.6 |
| R32 = −165.466 | D32 = 2.00 | | |
| R33 = ∞ | D33 = 6.00 | N18 = 1.51633 | V18 = 64.1 |
| R34 = ∞ | | | |

| f | 11.3 | 67.1 | 96.7 |
|---|---|---|---|
| l1 | 1.0558 | 32.4492 | 82.4492 |
| l2 | 33.8465 | 2.9282 | 2.9282 |
| l3 | 3.175 | 2.7 | 2.7 |
| l4 | 1.5 | 1.5 | 12.68 |
| l5 | 14.0 | 14.0 | 3.32 |
| dV | 3.5 | 3.5 | 3.0 |
| RV | −40.41785 | −40.41785 | −10.31489 |

Description will now be made of an embodiment which is a little different in form from the above-described zoom lens system.

That is, in the above-described embodiment, a unit of variable refractive power is utilized as the second magnification changing unit, whereby the compactness of the zoom lens system is achieved, but in the embodiment described below, there is shown a zoom lens system which is further improved and more compact and yet capable of high magnification change.

Figure 5:
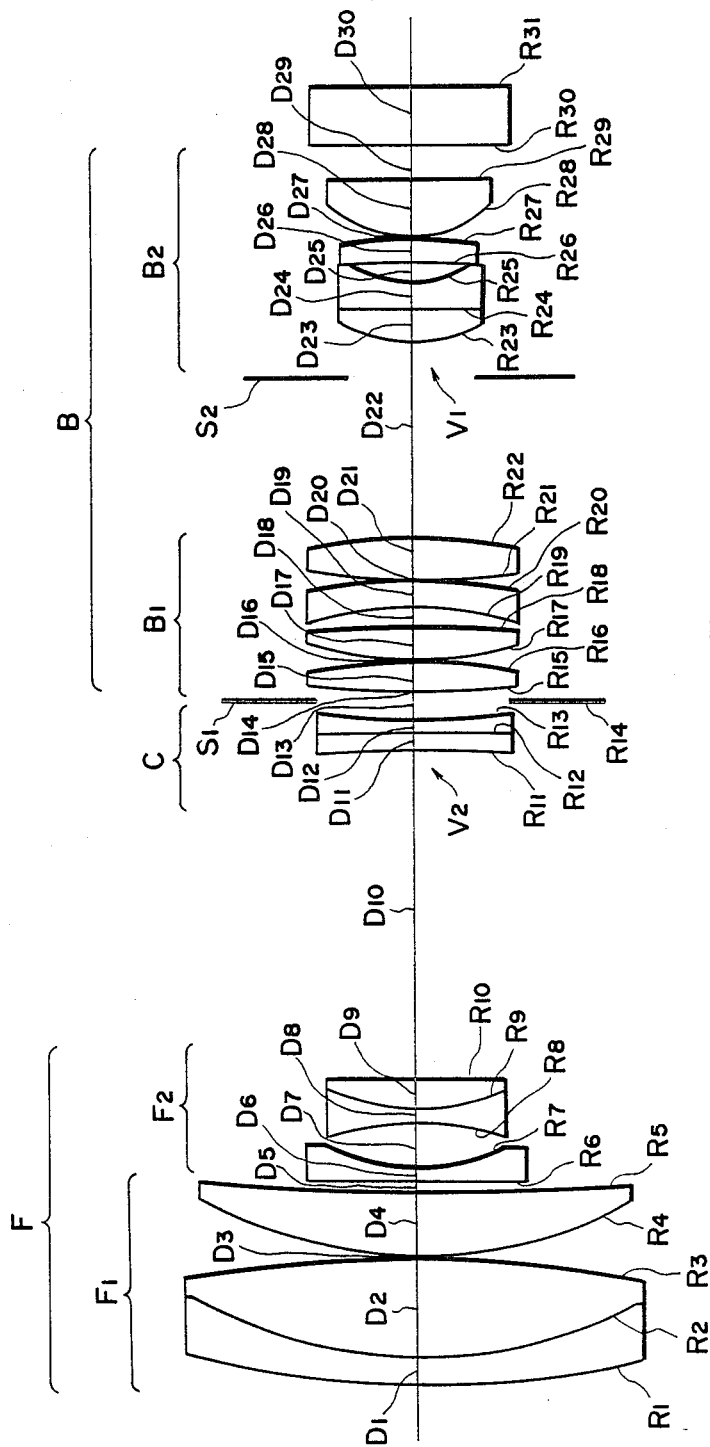
FIG. 5 is a cross-sectional view of a zoom lens system according to another embodiment of the present invention.

FIG. 5 is a cross-sectional view of a zoom lens system according to another embodiment of the present invention.

In FIG. 5, F designates a first lens group comprising a first lens unit F1 having a positive refractive power and fixed during zooming, and a first magnification changing lens unit F2 movable on the optic axis to govern the magnification change from the wide angle end to the intermediate focal length (the first magnification change range). C denotes a correcting lens unit provided with an element V2 having a variable radius of curvature and governing the correction of the image surface position during the magnification change of the first magnification changing lens unit F2 and the correction of the image surface position during the magnification change of B2 which will be described later. B designates a second lens group comprising a lens unit B1 which has a positive refractive power and is a part of a relay, and a second magnification changing lens unit B2 provided with an element V1 having a variable radius of curvature and changing the magnification from the intermediate focal length to the telephoto end (the second magnification change range).

Under the above-described construction, the first lens unit and the first magnification changing lens unit secure a magnification change ratio of the order of six times, and further magnification change is accomplished by varying the radius of curvature of the second magnification changing lens unit.

In the present embodiment, the element having a variable refractive power refers to one which is forward of an elastic material such as silicone rubber, liquid crystal, liquid or the like and whose refractive power $\theta$ (or refractive index n) is varied by pressure, heat, electric field, magnetic field or the like.

The correcting lens unit C in the present embodiment corrects the movement of the image surface taking place during a magnification change and performs the function as a focus lens. In an ordinary zoom lens, namely, a photo-taking system wherein zooming is effected with the system moved on the optic axis, an attempt to perform the two functions of focusing and correction of the image surface during zooming complicates the construction of the zoom ring, whereas the use of an element whose refractive power varies continuously as in the present invention leads to the possibility of achieving the two functions by a simple construction and thus, it is useful. Further, in the present embodiment, the movement of the image surface by the first magnification changing lens unit F2 and the second magnification changing lens unit B2 is accomplished by the same correcting lens unit C to thereby achieve the compactness of the zoom lens.

Now, in the present embodiment, to reduce the amounts of generation and the amounts of fluctuation of spherical aberration and coma, it is desirable that the first surface of the correcting lens unit C be formed as the element V2 of variable radius of curvature and the radius of curvature thereof satisfy the aplanatic or concentric condition within range of variation. That is, when the refractive index of the element V2 of variable radius of curvature is n and the radius of curvature is RV2 (R23) and the length of the object point of the first lens unit F1 and the first magnification changing lens unit F2 as measured from the vertex of RV2 is S (the object side from the vertex of the surface is negative and the image side is positive), a construction which satisfies one of the following equations (1) and (2) is adopted: ps $$S = (n + 1)RV2 \quad (1)$$
$$S = RV2 \quad (2)$$

Also, as regards the lens units B1 and B2 rearward of the iris diaphragm S1, the lens nearer to the object side may preferably be comprised of a positive lens to shorten the full length and the aperture. The lens unit B2 is made into a system in which the first surface of a plano-convex lens having its convex surface facing the object side is provided by the element V1 of variable radius of curvature and is joined to a plano-concave lens of optical glass rearward thereof. Further rearwardly of it, two positive lenses are added so that the lens unit B2 as a whole has a positive power even when the radius of curvature of the element V1 is varied. This second magnification changing system B2 effects magnification change by a variation in the radius of curvature without involving the movement of the lens in the direction of the optic axis, whereby as compared with the construction as shown in U.S. Pat. No. 4,033,674 wherein magnification change is accomplished by the ordinary movable lens group, the space necessary for movement is not required between the lens units B1 and B2 and therefore, the bulkiness and complexity of the lens system can be avoided. Further, this construction permits a fixed field stop (shown in FIG. 5) to be placed between the lens units B1 and B2, and can also assume a construction which intercepts the unnecessary light to the surroundings of the picture plane which will involve the aberrations on the telephoto side.

However, to obtain the magnification change ratio 1.44 of this second magnification changing system, the element V1 of variable radius of curvature must vary the focal length of the lens unit B2 from the intermediate focal length to the telephoto end in the direction in which the focal length is increased about twice. At this time, the amount of variation in the power of the element V1 need be about 20-30 diopters, and the aberrations generated in this surface must be suppressed to the utmost. As an effective measure for this, it is desirable that in the area in which the radius of curvature of the element V1 is varied, the condition concentric relative to the on-axis object point be satisfied as previously described in connection with C.

The above-described construction of the lens unit B2 also causes a variation in the spacing between the principal points of the lens unis B1 and B2 when the radius of curvature of the element V1 is varied, and this has the effect of promoting the magnification change ratio of the second magnification changing lens unit and therefore, such construction is more advantageous for correcting aberrations and making the lens system compact.

In the present embodiment, only the curvature of one surface of the element is varied, but alternatively, the curvatures of the both surfaces of the element may be varied. Also, a plurality of elements may be used.

Figure 6:
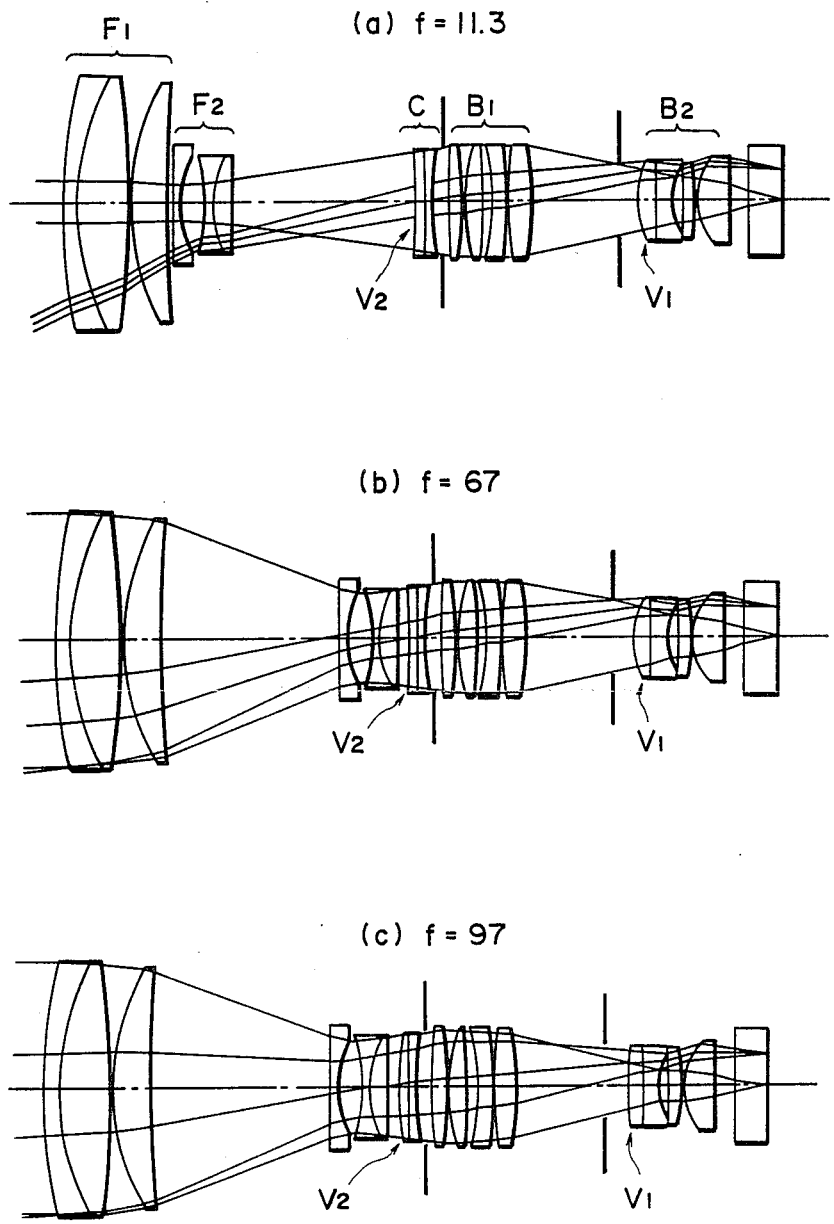
FIGS. 6(a), (b) and (c) show the optical paths of a third embodiment of the zoom lens system according to the present invention.
Figure 7A:
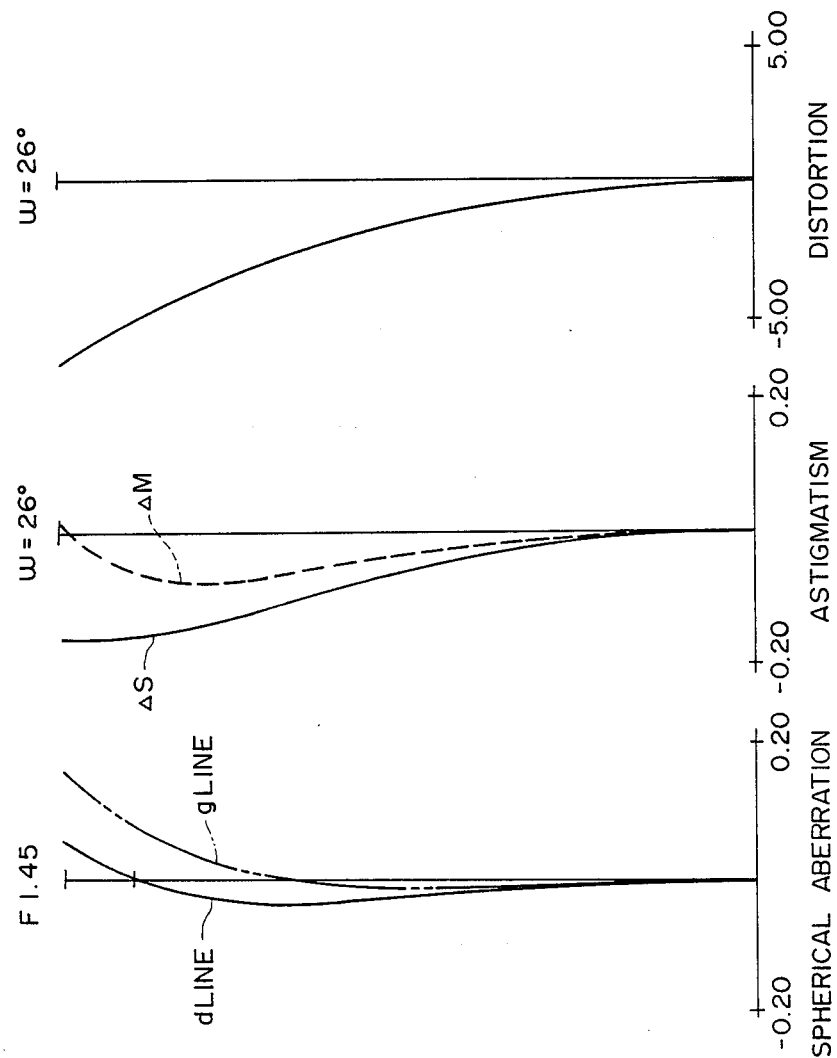
FIGS. 7(a), (b), and (c) show the longitudinal aberrations of numerical value embodiment 3.
Figure 7B:
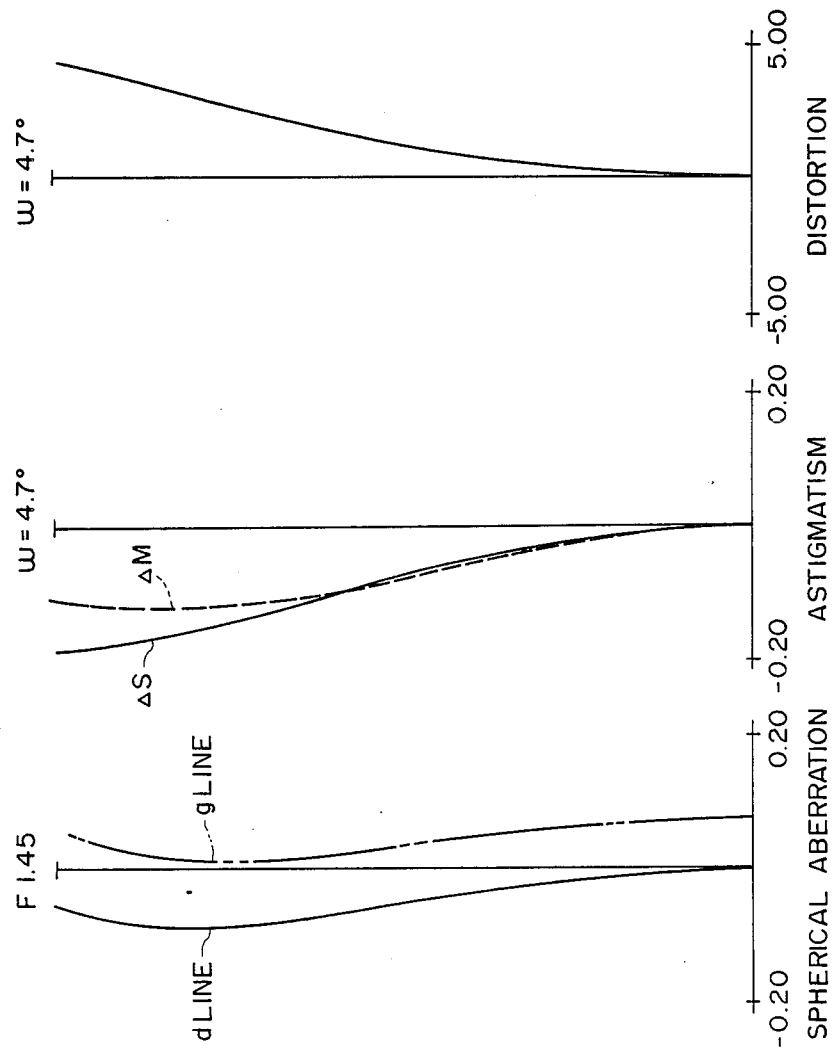
Figure 8A:
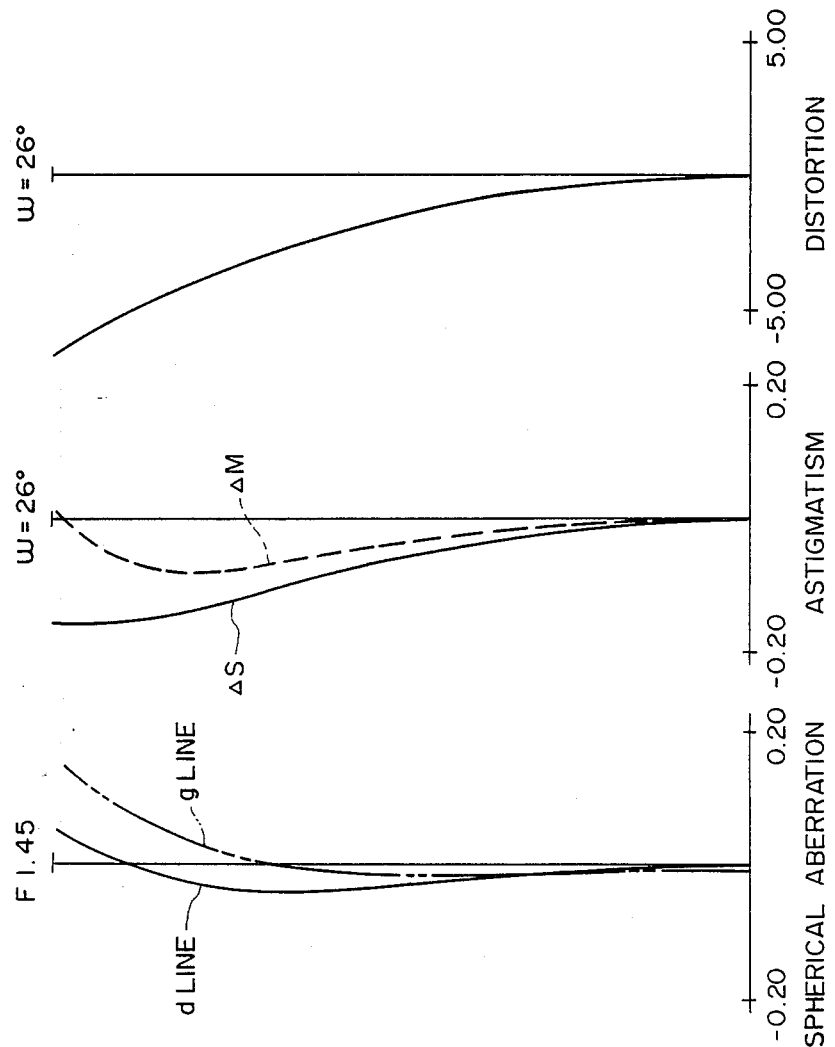
FIGS. 8(a), (b) and (c) show the longitudinal aberrations of numerical value embodiment 4 in which $\Delta S$ and $\Delta M$ represents the sagittal image surface and the meridional image surface, respectively.
Figure 8B:
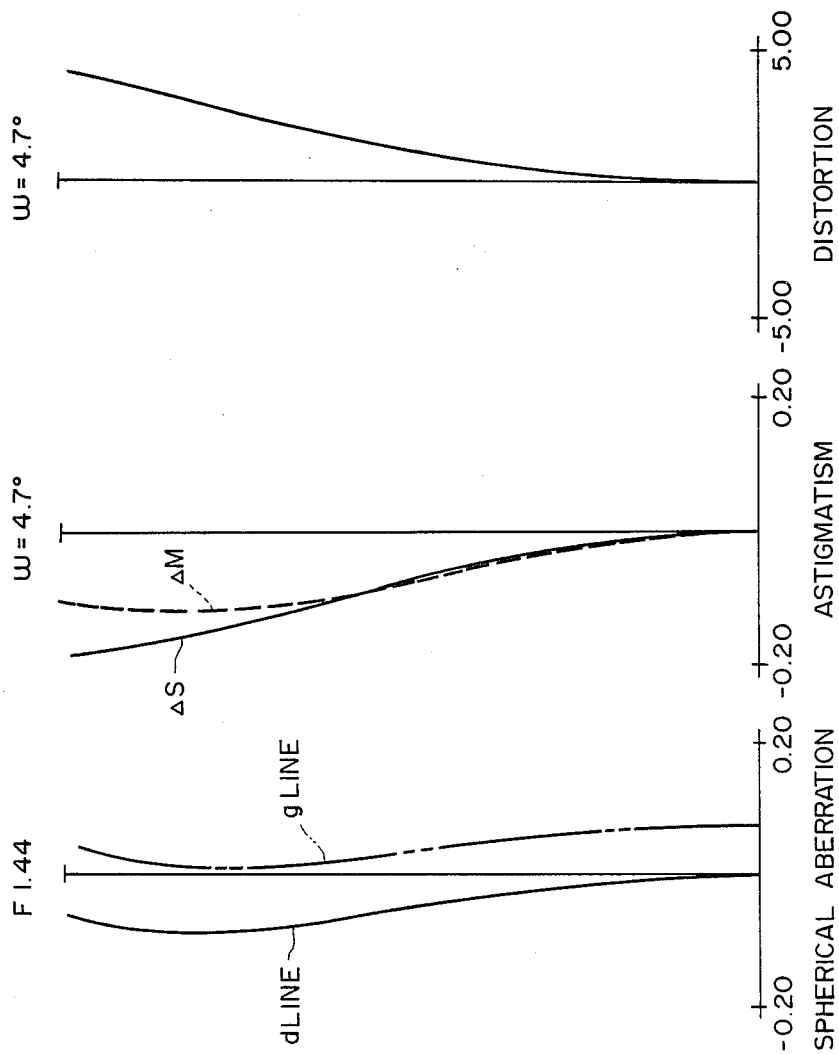

FIGS. 6(a), (b) and (c) show the optical paths of a third embodiment of the zoom lens system according to the present invention. FIG. 6(a) shows the optical path when the focal length f = 11.3, FIG. 6(b) shows the optical path when f = 67, and FIG. 6(c) shows the optical path when f = 97.

As described aobve, according to the present invention, there can be achieved a zoom lens system for use in a television camera, a video camera, a still camera or the like which is compact and moreover can obtain a high magnification change ratio.

Numerical value embodiments of the present invention will be below. In the numerical value embodiments, the symbols are similar in significance to those shown in the previous embodiment.

(Embodiment 3)

F = 11.272~96.667 FNO = 1:1.45~2.09 2 W = 52°~6.5° (W: field angle)

| | | | |
|---|---|---|---|
| R1 = 109.993 | D1 = 2.66 | N1 = 1.80518 | V1 = 25.4 |
| R2 = 47.886 | D2 = 9.95 | N2 = 1.51633 | V2 = 64.1 |
| R3 = −154.805 | D3 = 0.15 | | |
| R4 = 44.560 | D4 = 6.66 | N3 = 1.60311 | V3 = 60.7 |
| R5 = 279.089 | D5 = D5 | | |
| R6 = 375.280 | D6 = 1.23 | N4 = 1.77250 | V4 = 49.6 |
| R7 = 19.204 | D7 = 5.06 | | |
| R8 = −25.100 | D8 = 1.10 | N5 = 1.69680 | V5 = 55.5 |
| R9 = 20.443 | D9 = 3.25 | N6 = 1.84666 | V6 = 23.9 |
| R10 = 607.240 | D10 = D10 | | |
| R11 = R11 | D11 = 1.68 | N7 = 1.40590 | V7 = 52.5 |
| R12 = ∞ | D12 = 1.32 | N8 = 1.72000 | V8 = 43.7 |
| R13 = 88.691 | D13 = 1.85 | | |
| R14 = iris diaphragm | D14 = 1.00 | | |
| R15 = 101.857 | D15 = 2.99 | N9 = 1.69680 | V9 = 55.5 |
| R16 = −67.647 | D16 = 0.10 | | |
| R17 = 36.621 | D17 = 3.88 | N10 = 1.69680 | V10 = 55.5 |
| R18 = −88.850 | D18 = 1.69 | | |
| R19 = −35.061 | D19 = 2.61 | N11 = 1.84666 | V11 = 23.9 |
| R20 = −111.316 | D20 = 0.10 | | |
| R21 = 127.344 | D21 = 4.32 | N12 = 1.62299 | V12 = 58.2 |
| R22 = −56.488 | D22 = D22 | | |
| R23 = R23 | D23 = D23 | N13 = 1.50900 | V13 = 34.7 |
| R24 = ∞ | D24 = 2.49 | N14 = 1.84666 | V14 = 23.9 |
| R25 = 10.820 | D25 = 2.37 | | |
| R26 = −4065.417 | D26 = 2.56 | N15 = 1.53172 | V15 = 48.9 |

-continued (Embodiment 3)

| | | | |
|---|---|---|---|
| R27 = −40.622 | D27 = 0.10 | | |
| R28 = 12.561 | D28 = 5.85 | N16 = 1.64328 | V16 = 47.9 |
| R29 = 246.554 | D29 = 3.35 | | |
| R30 = ∞ | D30 = 6.00 | N17 = 1.51633 | V17 = 64.1 |
| R31 = ∞ | | | |

| f | 11.272 | 67.128 | 96.667 |
|---|---|---|---|
| R11 (∞) | −187.744 | −161.414 | 87.863 |
| R23 | 13.294 | 13.294 | 42.831 |
| D5 | 1.05 | 32.60 | 32.60 |
| D10 | 33.85 | 2.30 | 2.30 |
| D22 | 19.23 | 19.23 | 19.83 |
| D23 | 3.60 | 3.60 | 3.00 |
| R11 (1 m) | −204.071 | 141.152 | 40.550 |

R11(∞) and R11(1 m) are the values when the object point is at infinity and 1 m from the first surface.

(Embodiment 4)

F = 11.272~96.667 FNO = 1:1.45~2.09 2 W = 52°~6.5° (W: field angle)

| | | | |
|---|---|---|---|
| R1 = 110.124 | D1 = 2.64 | N1 = 1.80518 | V1 = 25.4 |
| R2 = 48.003 | D2 = 9.91 | N2 = 1.51633 | V2 = 64.1 |
| R3 = −156.161 | D3 = 0.15 | | |
| R4 = 44.569 | D4 = 6.70 | N3 = 1.60311 | V3 = 60.7 |
| R5 = 278.099 | D5 = D5 | | |
| R6 = 359.238 | D6 = 1.25 | N4 = 1.77250 | V4 = 49.6 |
| R7 = 19.227 | D7 = 5.12 | | |
| R8 = −24.902 | D8 = 1.10 | N5 = 1.69680 | V5 = 55.5 |
| R9 = 20.535 | D9 = 3.23 | N6 = 1.84666 | V6 = 23.9 |
| R10 = 596.677 | D10 = D10 | | |
| R11 = R11 | D11 = 1.65 | N7 = 1.40590 | V7 = 52.5 |
| R12 = ∞ | D12 = 1.30 | N8 = 1.72000 | V8 = 43.7 |
| R13 = 89.127 | D13 = 1.84 | | |
| R14 = iris diaphragm | D14 = 1.00 | | |
| R15 = 100.795 | D15 = 3.05 | N9 = 1.69680 | V9 = 55.5 |
| R16 = −65.273 | D16 = 0.10 | | |
| R17 = 36.874 | D17 = 3.90 | N10 = 1.69680 | V10 = 55.5 |
| R18 = −87.762 | D18 = 1.65 | | |
| R19 = −35.086 | D19 = 2.62 | N11 = 1.84666 | V11 = 23.9 |
| R20 = −111.432 | D20 = 0.10 | | |
| R21 = 124.614 | D21 = 4.32 | N12 = 1.62299 | V12 = 58.2 |
| R22 = −56.676 | D22 = D22 | | |
| R23 = R23 | D23 = D23 | N13 = 1.50900 | V13 = 34.7 |
| R24 = ∞ | D24 = 2.57 | N14 = 1.84666 | V14 = 23.9 |
| R25 = 10.800 | D25 = 2.37 | | |
| R26 = −2269.745 | D26 = 2.55 | N15 = 1.53172 | V15 = 48.9 |
| R27 = −41.029 | D27 = 0.10 | | |
| R28 = 12.531 | D28 = 5.84 | N16 = 1.64328 | V16 = 47.9 |
| R29 = −254.122 | D29 = 3.29 | | |
| R30 = ∞ | D30 = 6.00 | N17 = 1.51633 | V17 = 64.1 |
| R31 = ∞ | | | |

| f | 11.272 | 67.128 | 96.667 |
|---|---|---|---|
| R11 (∞) | −153.402 | −145.590 | 92.858 |
| R23 | 13.350 | 13.350 | 43.947 |
| D5 | 1.05 | 32.60 | 32.60 |
| D10 | 33.85 | 2.30 | 2.30 |
| D22 | 19.22 | 19.22 | 19.82 |
| D23 | 3.60 | 3.60 | 3.00 |
| R11(∞) | −164.082 | 157.410 | 41.683 |

R11(∞) and R11(1 m) are the values when the object point is at infinity and 1 m from the first surface.

I claim:

1. A zoom lens comprising a first lens unit movable on an optic axis for a first magnification change, a second lens unit whose refractive power is variable for a second magnification change, and a correcting lens unit for correcting the movement of an image surface during a first or second magnification change.

2. A zoom lens according to claim 1, wherein said first lens unit has a first magnification change in a first range, and said second lens unit has a second magnification change in a second range that is succeeding to said first magnification change range.

3. A zoom lens according to claim 1, wherein said lens units are disposed along said optic axis from the object side in the order of said first lens unit, said correcting lens unit and said second lens unit.

4. A zoom lens according to claim 1, wherein said correcting lens unit is a single unit and corrects the movement of the image surface by said first and second lens units by varying the refractive power thereof.

5. A zoom lens according to claim 1, wherein said correcting lens unit comprises a first correcting lens sub-unit and a second correcting lens sub-unit both movable along an optic axis, said first correcting lens sub-unit is positioned on the image surface side of said first lens unit so as to correct the movement of the image surface by said first lens unit, and said second correcting lens sub-unit is positioned on the object side of said second lens unit so as to correct the movement of the image surface by said second lens unit.

6. A zoom lens according to claim 4, wherein a focusing is effected by said correcting lens unit.

7. A zoom lens according to claim 5, wherein said first lens unit comprises a focusing lens.

8. A zoom lens according to claim 6, wherein said correcting lens unit comprises a radius of curvature that is variable and satisfies a substantially aplanatic condition relative to an on-axis object point at a position in an area of variation of the radius of curvature.

9. A zoom lens according to claim 6, wherein said second lens unit comprises a radius of curvature that is variable and satisfies a substantially concentric condition relative to an on-axis object point at a position in an area of variation of the radius of curvature.

10. A zoom lens according to claim 7, wherein said second lens unit comprises a radius of curvature that is variable and satisfies a substantially concentric condition relative to an on-axis object point at a position on the wide angle side in an area of variation of the radius of curvature.

11. A zoom lens comprising a first lens group having a first lens unit movable on an optic axis for a first magnification change, a second lens group having a second lens unit whose refractive power is variable for a second magnification change, and a correcting lens unit for correcting the movement of an image surface by said first lens unit and said second lens unit.

12. A zoom lens according to claim 11, wherein said correcting lens unit is positioned between said first lens group and said second lens group and varies the refractive power thereof.

* * * * *

UNITED STATES PATENT AND TRADEMARK OFFICE
CERTIFICATE OF CORRECTION

PATENT NO. : 4,871,240

DATED : October 3, 1989

INVENTOR(S) : Suda

It is certified that error appears in the above-identified patent and that said Letters Patent is hereby corrected as shown below:

ON TITLE PAGE:

[56] References Cited:

U.S. PATENT DOCUMENTS

"4,407,567 10/1983 Michalot et al." should read --Michelet et al.--.

COLUMN 3:

Line 16, "intermidiate" should read --intermediate--.

Line 35, "$V_1,$" should read --$V_1$ varies,--.

Line 42, "suffer" should read --rubber--.

Line 68, "j=97." should read --f=97.--.

COLUMN 4:

Line 37, "R26=R  D26=d" should read --R26=Rv  D26=dv--.

Line 43, "N18=1.511633" should read --N18=1.51633--.

UNITED STATES PATENT AND TRADEMARK OFFICE
CERTIFICATE OF CORRECTION

PATENT NO. : 4,871,240

DATED : October 3, 1989

INVENTOR(S) : Harada, et al.

It is certified that error appears in the above-identified patent and that said Letters Patent is hereby corrected as shown below:

COLUMN 5:

Line 12, "R26=R  D26=d" should read --R26=Rv  D26=dv--.

Line 21, "82.4492" should read --32.4492--.

Line 22, "3.175" should read --3.1751--.

Line 68, "for-" should read --formed--.

COLUMN 6:

Line 1, "ward" should be deleted.

Line 3, "power θ should read --power φ--.

Line 37, "ps" should be deleted.

UNITED STATES PATENT AND TRADEMARK OFFICE
CERTIFICATE OF CORRECTION

PATENT NO. : 4,871,240

DATED : October 3, 1989

INVENTOR(S) : Harada, et al

It is certified that error appears in the above-identified patent and that said Letters Patent is hereby corrected as shown below:

COLUMN 7:

Line 34, "aobve," should read --above,--.

Line 40, "be below." should read --be shown below.--.

Signed and Sealed this

Twenty-fifth Day of February, 1992

Attest:

HARRY F. MANBECK, JR.

Attesting Officer

Commissioner of Patents and Trademarks